United States Patent [19]

Leame

[11] Patent Number: 4,967,469
[45] Date of Patent: Nov. 6, 1990

[54] INSERTION FINGER

[75] Inventor: Filippo Leame, Schöneck, Fed. Rep. of Germany

[73] Assignee: Statomat Spezialmaschinen GmbH, Niederdorfelden, Fed. Rep. of Germany

[21] Appl. No.: 382,498

[22] Filed: Jul. 21, 1989

[30] Foreign Application Priority Data

Jul. 23, 1988 [DE] Fed. Rep. of Germany ....... 3825064

[51] Int. Cl.⁵ ............................................ H02K 15/09
[52] U.S. Cl. ........................................ 29/736; 29/596
[58] Field of Search ................. 29/736, 734, 732, 596, 29/598, 606

[56] References Cited

U.S. PATENT DOCUMENTS 4,653,181 3/1987 Veser ..................................... 29/736

Primary Examiner—Carl E. Hall
Attorney, Agent, or Firm—Larson and Taylor

[57] ABSTRACT

The insertion finger is made of a striptype heart (10) and sheet metal lips (16) connected thereto. It is intended for use with a device for inserting coils in stators of electrical machines. More specifically, it is used for the insertion of coils into grooves of helical stator sheet packages. For that purpose, the heart (10) is composed of a plurality of segments (20) axially disposed in side-by-side relationship and movable relative to one another. This construction causes the insertion finger to follow a helical stator tooth, insuring at the same time a safe and non-resilient guidance of the coils during the process of insertion and a uniform support of the forces to be absorbed throughout the length of the insertion finger so that there is relatively low wear.

10 Claims, 4 Drawing Sheets

INSERTION FINGER

FIELD OF THE INVENTION

The present invention is concerned with an insertion finger composed of a strip-type heart and sheet metal lips connected thereto, for use with a means for the insertion of coils into stators of electrical machines several insertion fingers guided respectively individually on a stator tooth, in a manner longitudinally displaceable, are axially movable as a group with a common drive, through the stator bore.

BACKGROUND OF THE INVENTION

An insertion finger of the afore-described type is described in German Gebrauchsmuster No. G 85 21 173.7 As are other conventional integrally formed insertion fingers, it is suitable only for the insertion of coils into stators exhibiting straight-lined axially parallel grooves.

Twisted stators (the grooves of which are helically formed throughout the axial length thereof), in a multiplicity of end-use applications, exhibit better electrical properties than stators comprising axially parallel grooves. However, hitherto, the coils had to be manually placed into the helical grooves. Alternatively flexible tongues respectively connected in pairs and also guided in pairs in a single stator groove of the type as described in DE-PS No. 26.58.891 had been used for this purpose. Admittedly, the flexibiltiy of these tongues permits its resilient deformation conforming to a helical stator groove, However, the flexibility thereof is the cause for the substantial disadvantages of such tongues. Through the coils accommodated therein, they are non-uniformly deformed and bulged, respectively, throughout the length thereof, this resulted, through heavy friction on the sharpedged stator sheets in the area of the bulging and on the ends springing apart, in extremely rapid wear. Moreover, the flexible tongues entangle in the helical stator grooves, thus being likely to lose the desired guidance of and abutment with the edges of the stator teeth.

SUMMARY OF THE INVENTION

It is, therefore, the object of the present invention to provide an insertion lamella suitable for the insertion of coils in stator grooves both of an axially parallel and of a helical configuration. While engaged during the insertion process with the stator teeth vis-a-vis the forces exerted by the coils, the lamella shows a substantially stiff behavior similar to that of the conventional solid straight-lined insertion fingers, respectively engaging two stator grooves. In addition, the lamella is sufficiently flexible to permit insertion into helical stator grooves as well.

The afore-described problem, in the practice of the invention, is solved in that the heart of the insertion finger is composed of a plurality of segments axially disposed in side-by-side relationship and movable relative to one another.

Regarding the solid, rigid insertion fingers, it was only cost-saving considerations that resulted in forming the same of a heart of unmachined or partly machined round bar steel and sheet metal lips secured thereto. As opposed thereto, the invention is based on the recognition that sheet metal lips and a plurality of heart segments axially arranged in side-by-side relationship also can be caused to functionally cooperate to attain an insertion finger. Such an insertion finger, on the one hand, is flexible and, on the other hand, during the insertion process in the peripheral direction of the stator sheet metal package, punctually, is extremely stiff. In the working position (in which the insertion finger straddles the head of a stator tooth, engaging with the sheet metal lips thereof the two adjacent stator grooves), it is of no relevance to the stiffness of the insertion finger in the transverse direction that the heart is subdivided into individual segments. The lateral force exerted by a coil track on an insertion finger of a so segmented heart does, therefore, not result in the bulging of the insertion finger. But, in view of the rigidity thereof throughout the entire length across the stator tooth, the insertion finger is supported thereon so that unit pressure and wear are relatively low. It is of no relevance in this respect whether the new insertion fingers are inserted prior to insertion of the coils into the stator groove and during the actual insertion process are stationary relative to the stator sheet package, or whether the insertion fingers are moved simultaneously with the coils to be inserted through the stator bore. Both the afore-mentioned insertion processes can be carried out with the new insertion finger, both with twisted stators and with those comprising axially parallel grooves. Although, in respect of the latter, insertion fingers of a simpler design, normally, are preferred for cost-saving considerations.

Another special advantage of the insertion finger according to the invention resides in that adjustment to the different lengths is very easy. Normally, stators of a special sheet cut are manufactured in different package heights. In all cases, the segments required herefore can be premanufactured in large piece numbers so that only a different number of segments of conforming sizes or, additionally, respectively only one segment individually length-adjusted, will then be needed.

An insertion tool composed of several insertion fingers not only in the working position, when in engagement with the stator teeth, but also externally of the stator, should be relatively rigid. This facilitates insertion of the coils between the insertion figners, and alignment with the stator teeth. For that purpose, in a form of embodiment of the invention preferred in practice, the segments are held under pressure in mutual abutment by means of at least one clamping member guided through the central segments. The clamping member, such as a threaded tensile rod, may be anchored, for example through screwing, into the rearmost segment and may be supported by a nut or screw head on the foremost segment.

It has proved to be a simple and useful design suitable for the intended end-use application, to interconnect adjacent segments through radial bearings. Such bearings may be, for example, bearing bushes of sinter metal or any other suitable material inserted into the segment bores. Alternatively, respectively one segment with a pin formed thereon front-sidedly may engage a corresponding bore in the adjacent segment. Radial bearings of this type between the segments not only do permit rotating movements but, in view of the bearing clearance, also the required tilting movements to the low extent required in view of the curved radii of the stator grooves occurring in practice. Better joints between the segments are achieved by spherical bearing faces; however, configurations of that type are correspondingly expensive. Conversely, in a particularly simple form of embodiment the formation of joints between the segments can be eliminated. This is especially so if the segments are threaded onto a clamping member of, for example, rod-type configuration. In a particularly simple configuration, the clamping member can be eliminated and instead the individual segments, through the sheet metal lips connected thereto for example by spot welding, are interconnected. The number of segments, in the first place, is dependent on the curvature of the stator grooves the helical course of which is to be followed by the insertion fingers.

The sheet metal lips can be formed on a single sheet bent about the heart. However, separate sheets can also be used for the two sheet metal lips and individually connected to the heart segments, for example by spot welding, soldering or cementing. This latter-mentioned form of embodiment is especially suitable if the starting material of the segments is round steel which on diametrically opposite sides is provided with flattenings so that the sheet metal lips with the portion adjacent thereto extend radially relative to the longitudinal axis of the stator bore. In order to prevent the sheets (preferably connected to the segments only in the central area thereof) from lifting during drilling of the insertion finger sectionally from the joining surface of the segment to an extent such that damage is likely to be done to the varnish insulation of the coil wire, provision is made according to a preferred form of embodiment of the invention, for flattenings. These flattenings of the segments, respectively longitudinally of a lateral edge, are staggered in step-type manner from the outer surface, with the steps respectively covering a lateral side of the sheet metals.

To preclude detrimental bulges or bends of the sheet metal lips in a twisted condition of the insertion finger, the segments on the contiguous ends thereof may be suitably provided with smaller diameters in the peripheral areas in abutment with the sheets of the sheet metal lips. It is substantially irrelevant that the sheet metal lips in the relatively short axial distances in the area of the joints between the segments are not supported thereon.

BRIEF DESCRIPTION OF THE DRAWING

A number of forms of embodiment of the invention will now be explained in greater detail with reference to the drawings, wherein.

DETAILED DESCRIPTION OF THE PREFERRED EMBODIMENTS

Figure 1:
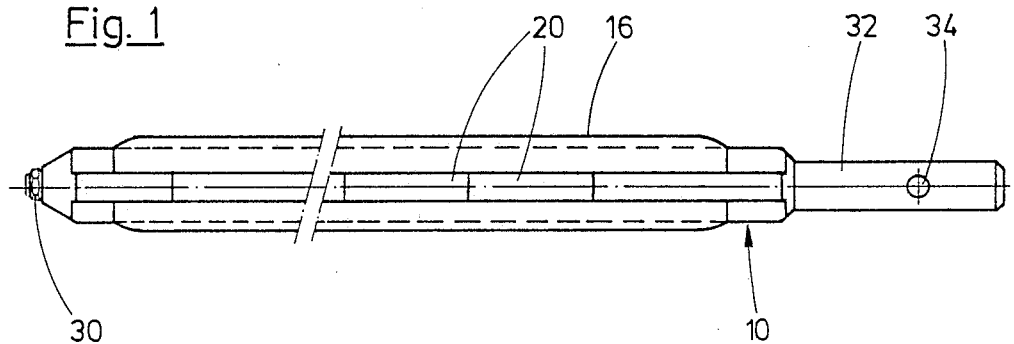
FIG. 1 is a side view of an insertion finger.
Figure 2:
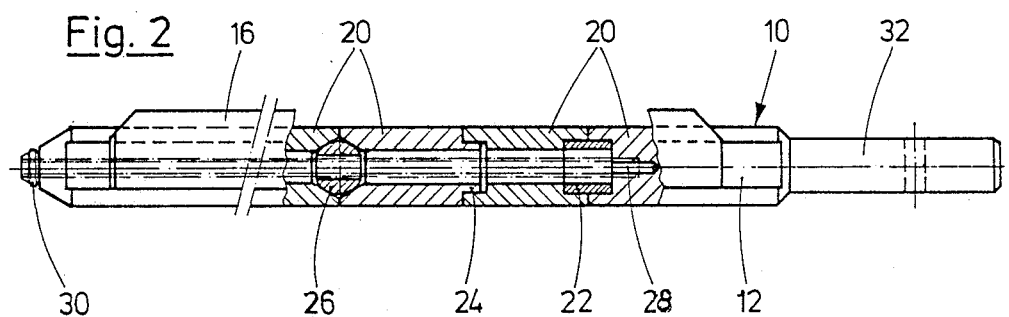
FIG. 2 is a side view turned by 90°, partially in section, of the insertion finger according to FIG. 1.
Figure 3:
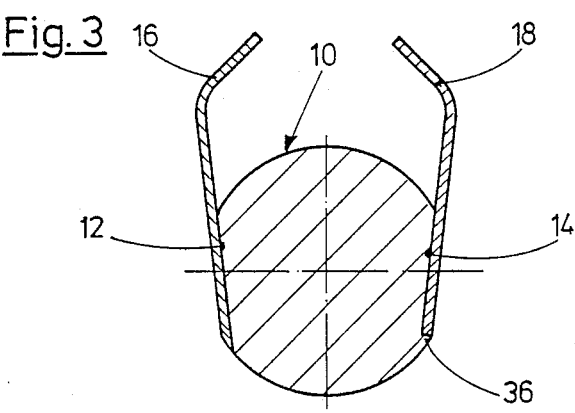
FIG. 3 is a cross-sectional view of the insertion finger according to FIGS. 1 and 2, exhibiting two differently configured (selectively employed) flattenings of the heart of the insertion finger.

The insertion finger as shown in FIGS. 1 to 3 comprises, as does the insertion finger described in DE-GM No. 85 21 173.7, a heart 10 (which, in that case, is flattened round bar material), and sheet metal lips 16 and 18, respectively, welded or soldered on either side to flattenings 12 and 14, respectively. The difference over the prior known insertion fingers resides in that the heart 10 is subdivided into a plurality of segments 20. Segments 20 are axially disposed in side-by-side relationship and rotatable relative to one another or, to a limited extent, also tiltable. For that purpose, FIG. 2 shows three different forms of embodiments of bearings between the individual segments. For example, a radial bearing bush 22 can be inserted in an aligning bore provided in two contiguous segments 20. Alternatively, the frontsided end of a segment 20 may be formed with a projecting pin 24 radially engaging a corresponding bore in the adjacent segment. Another bearing alternatively employed may be a so-called universal bearing. The universal bearing can be either approximately half-cup-shaped spherical bearing faces of the contiguous segments 20 supported on a ball 26 inserted therebetween, or a semi-spherical projection provided on one segment in a mating half-cup provided in the other segment. Moreover, it is possible for the segments 20 to be simply in flat abutment with one another with no precise guidance through a radial bearing or ball bearing, and to perform a sliding movement relative to one another during twisting of the insertion finger.

A rod 28 forming the clamping member extends, in axial direction and in central position, through the front-sided and all central segments 20. The rear end of rod 28 is provided with a screw thread being screwed into a mating threaded bore provided in the rearmost segment 20. Rod 28 is supported on its foremost end equally provided with a thread, through a nut 30 on the outer front face of the foremost segment 20. Through tightening the nut 30, the segments 20 are forced one against the other to thereby increase the rigidity of the insertion finger without sacrifcing the articulated flexibility. As rod 28 at the same time holds the segments 20 together, it will not be absolutely necessary for all segments to be connected to the sheet metal lips 16 and 18, respectively. The sheet metal lips 16 and 18, respectively, preferably are anyway not welded, soldered or in any other way connected throughout the length of the segments 20 thereto but only at individual points and in limited zones, respectively. In practice, normally one to three welded points on each side, approximately in the axial center of the segment, will be sufficient to reliably bond the same to the sheet metal lip 16 and 18, respectively, provided on that side.

In the example of embodiment as shown, the rearmost segment 20 is integrally formed with a shaft 32 provided with a transverse bore 34. The insertion finger, by use of shaft 32, can be brought into engagement with two discs, rings or ring segments which are rotatable relative to one another and which are concentric or in axial series arrangement. Through the relative movement of the discs ring, or ring segments a desired oblique position of the insertion finger relative to the axis of rotation can be generated. Alternatively, it is possible for the insertion finger to be made with no shaft 32 and to dispose the same immediately on the rearmost segment 20 as shown in DE-GM No. 85 21 173. Depending on the case of application, a suitable support can be chosen maintaining the insertion finger in the desired oblique position corresponding to the helix of the stator sheet package. In that case, rod 28 also can be guided across the rearmost segment 20 and can be supported, for example, equally by a nut as used with the front end on the outer front face of the rearmost segment.

In the example of embodiment as shown on the left-hand side of FIG. 3, the flattening 12 of the round bar steel as used for heart 10 is not immersed in the material. The rear edge of the sheet metal lip 16 is thus ground to conform to the peripheral face of the round bar steel. As compared therewith, in the form of embodiment as shown in FIG. 3, righthand side thereof, the flattening 14 at the rear end thereof is confined by a step 36. The height of step 36 corresponds to the thickness of the sheet metal lip 18, thereby covering the rear edge thereof. This results in reducing the risk of damage to the coil wire at the rear edge of the sheet metal lip 18 even if the rear edge, during twisting of the insertion finger, is slightly lifted from a segment 20 of the heart 10.

Figure 4:
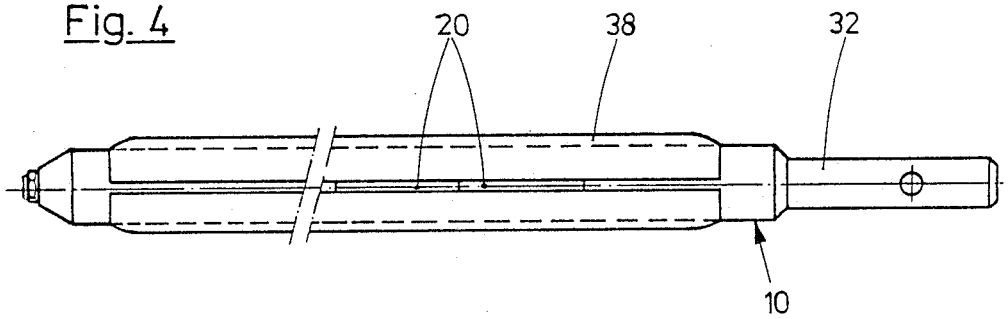
FIGS. 4-6 are side and cross-sectional views according to FIGS. 1 to 3, of another form of embodiment.
Figure 5:
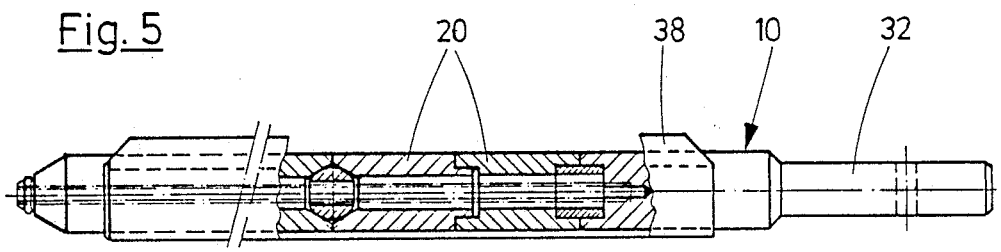
Figure 6:
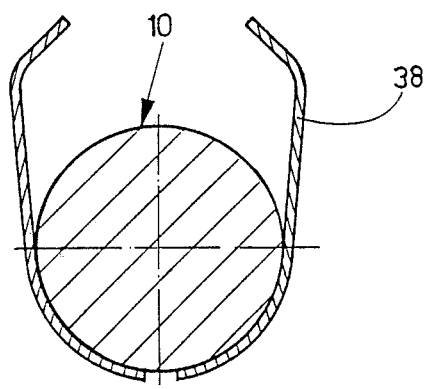

The embodiment according to FIGS. 4-6 distinguishes from the one according to FIGS. 1 to 3 only in that the segments 20 simply are but sections of a round steel otherwise unfinished on the surface. Accordingly, the two sheet metal lips 38, in the area of abutment thereof with the segments of heart 10, are bent to conform to the round steel radius. It is understood that the two metal sheet lips 38 also can be integrally formed of a single sheet metal strip as shown, for example, in FIG. 7 among the three insertion fingers as illustrated.

Figure 7:
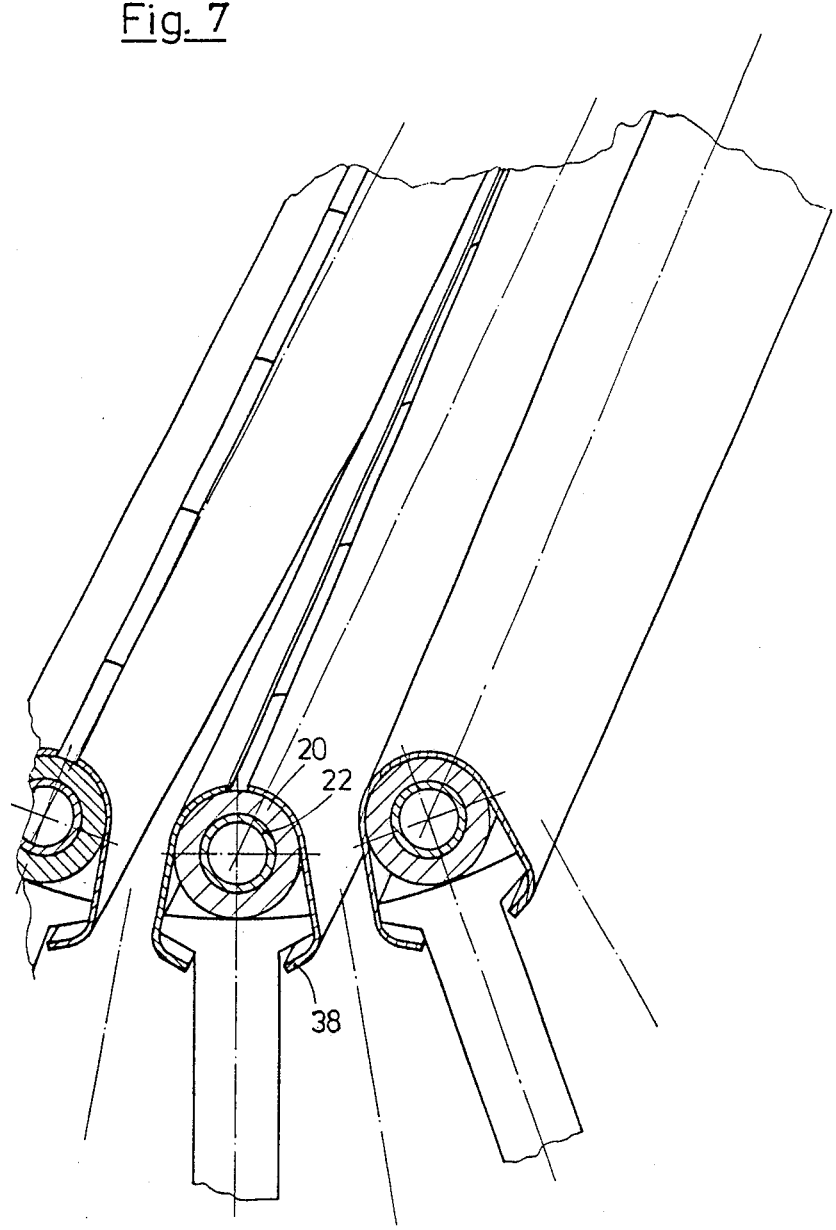
FIG. 7 is a perspective partial view of several insertion fingers of an insertion tool in abutment with the stator teeth of a twisted stator sheet metal package.

Incidentally, FIG. 7 reveals, especially in the lefthand and central insertions fingers, the curvature and helix thereof once they respectively cover a stator tooth of a helical stator sheet package.

Figure 8:
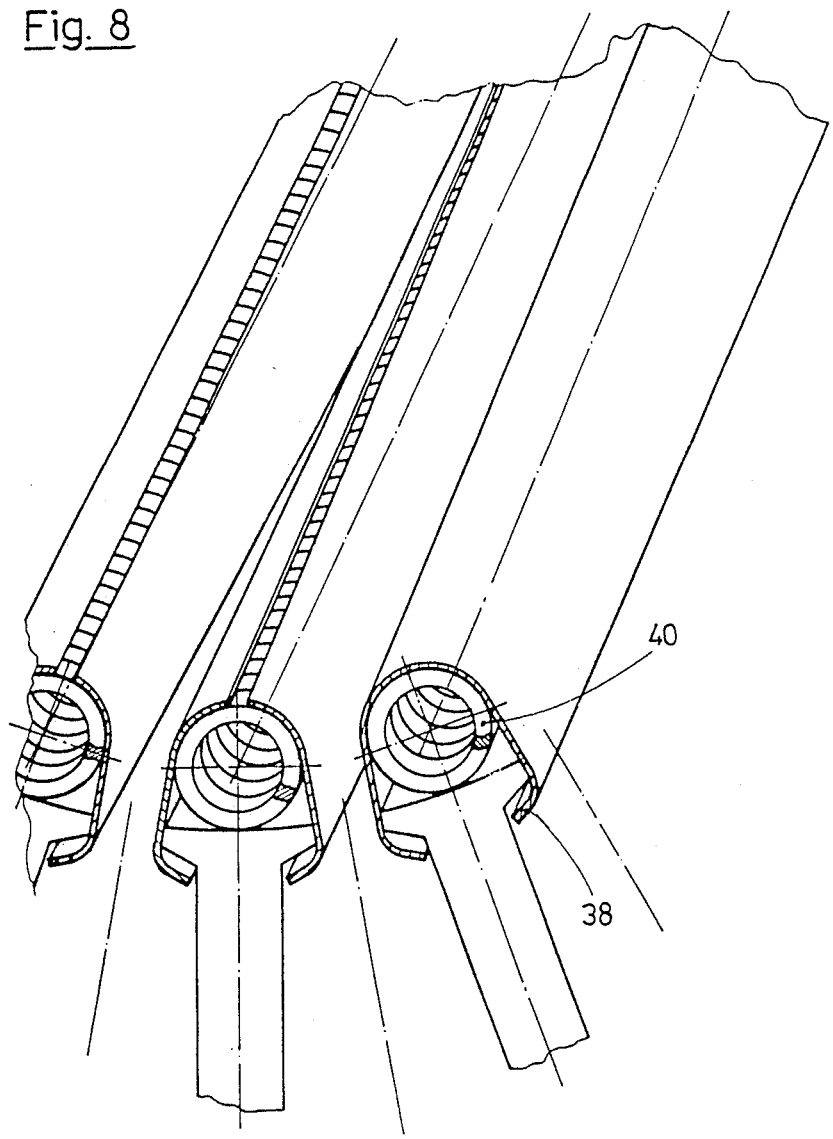
FIG. 8 is a perspective view, according to FIG. 7, of a plurality of insertion fingers having a heart formed by a helical spring.

Finally, FIG. 8 shows an example of embodiment in which each insertion finger, in the heart thereof, is composed of a helical spring 40. The two sheet metal lips 38, in the area of their abutment with the windings of the screw-threaded spring 40, are bent in conformity with the outer diameters thereof. A single sheet metal strip forming the two sheet metal lips 38 would be bent in the same manner. A connection between the helical spring 40 and the sheet metal lips 38, preferably, is established at individual points only. In that respect, the afore-going statements apply in analogy. Beyond that, a shaft 32 is rigidly connected to the rear end of the helical spring, and a header is rigidly connected to the front end thereof so that the two ends of the insertion lamella are identical with those of the afore-described forms of embodiment. By shaping the helical spring 40, the same may also have the contour of heart 10 according to FIG. 3 so that the sheet metal lips on opposite planar faces can be connected to the helical spring 40.

I claim:

1. An insertion finger used for inserting a coil in a stator of an electrical machine, said insertion finger forming one of a group of insertion fingers which insertion fingers of the group are guided for longitudinal displacement by respective stator teeth of the stator and which group is axially moved through a stator bore, said insertion finger comprising:
   a strip-type heart including a plurality of segments axially disposed in a side-by-side relationship and movable relative to on another; and
   sheet metal lips connected to said heart for engaging one of said stator teeth and guiding said finger through said bore.

2. An insertion finger as claimed in claim 1 and further including a radial bearing interconnecting adjacent said segments.

3. An insertion finger as claimed in claim 1 and further including a spherical bearing provided between adjacent said segments.

4. An insertion finger as claimed in claim 1 and further including a clamping member which passes through at least central ones of said segments and which holds said segments together under pressure.

5. An insertion finger as claimed in claim 1 wherein said sheet metal lips are connected to said heart by connection only to central spots of a respective said segment.

6. An insertion finger as claimed in claim 1 wherein said segments are made from a round bar steel which is at most only partially finished.

7. An insertion finger as claimed in claim 1 wherein said segments have contiguous ends, said contiguous ends including areas in abutment with said sheet metal lips which said areas have a reduced diameter.

8. An insertion finger as claimed in claim 1 wherein a rearmost said segment includes a guiding shaft which is engageable by guiding portions which guiding portions are adjustable relative to one another.

9. An insertion finger as claimed in claim 1 wherein each said segment includes flattenings on opposite sides thereof, each said flattening being in abutment with a respective said sheet metal lip and including a lateral edge forming a step against which an edge of said sheet metal lip rests and is covered thereby.

10. An insertion finger as claimed in claim 1 wherein said segments are windings of a helical spring.

* * * * *